United States Patent [19]

Kim

[11] Patent Number: 5,331,349
[45] Date of Patent: Jul. 19, 1994

[54] PICTURE-OUT-PICTURE CONTROL APPARATUS AND METHOD THEREOF

[75] Inventor: Jeong H. Kim, Seoul, Rep. of Korea

[73] Assignee: Samsung Electronics Co., Ltd., Kyungki, Rep. of Korea

[21] Appl. No.: 22,624

[22] Filed: Feb. 25, 1993

[30] Foreign Application Priority Data

Feb. 29, 1992 [KR] Rep. of Korea ............ 92-3348

[51] Int. Cl.$^5$ .............................. H04N 5/45
[52] U.S. Cl. .................... 348/567; 348/568
[58] Field of Search ............... 358/22 PIP, 140, 183, 358/230, 181; 348/567, 568; H04N 5/45

[56] References Cited

U.S. PATENT DOCUMENTS

| | | | |
|---|---|---|---|
| 4,991,012 | 2/1991 | Yoshino | 358/22 PIP X |
| 5,040,067 | 8/1991 | Yamakazi | 358/22 PIP X |
| 5,146,335 | 9/1992 | Kim et al. | 358/140 X |

*Primary Examiner*—Victor R. Kostak
*Attorney, Agent, or Firm*—Sughrue, Mion, Zinn, Macpeak & Seas

[57] ABSTRACT

A method and an apparatus for converting a video signal having a predetermined aspect ratio into a signal adapted for a television receiver having a wider aspect ratio. An analog to digital converter converts the received video signal into a digital signal. A main picture processor converts the video signal of the first aspect ratio into a main screen of the television receiver. A picture-out-picture processor converts the video signal having the first aspect ratio into at least one picture-out-picture screen of the television receiver. A multiplexed picture formation portion multiplexes the video signals for the main and picture-out-picture screens into a video signal having the second aspect ratio appropriate for the television receiver. A control signal generator controls the picture-out-picture processor and the multiplexed picture formation portion. When an NTSC broadcast is displayed on the television receiver having a 16-to-9 aspect ratio, the pictures are prevented from being spread to the left and right sides of the screen. Utilization of the POP screens facilitates search or comparison of the important pictures when watching the TV.

15 Claims, 2 Drawing Sheets though high definition television broadcasts are not yet widely practiced, apparatus and methods for displaying the NTSC broadcast have been developed. Further, a video signal of the video cassette recorder, having a size of a visual system transmission algorithm (VISTA) on a television receiver with a 16-to-9 aspect ratio, have also been developed. If temporal compression of the video signal is not performed when displaying the NTSC broadcast on the 16-to-9 television receiver, the displayed pictures become spread out in the left and right directions on the screen. Accordingly, to display the NTSC broadcast with a 4-to-3 aspect ratio on the television receiver with a 16-to-9 aspect ratio, the NTSC broadcast signal should be temporally compressed, so that a user can watch the normal video pictures. However, since the temporally compressed video signal is short along the horizontal direction, the left or right side of the screen remains blank.

PICTURE-OUT-PICTURE CONTROL APPARATUS AND METHOD THEREOF

BACKGROUND OF THE INVENTION

The present invention relates to a control method and apparatus capable of displaying a video signal having a narrow aspect ratio on a television receiver having a wide aspect ratio. More particularly, it relates to a picture-out-picture control apparatus and method capable of displaying a plurality of picture-out-pictures (hereinafter referred to as POP) on a blank screen which is produced when an NTSC (National Television System Committee) broadcast is displayed on a television receiver having a wide aspect ratio such as a high definition television (HDTV).

The present NTSC television has a 4-to-3 aspect ratio. However, a 16-to-9 aspect ratio, such as in the high definition television, provides a user with a much more vivid image or stereo-like-vision. Even though high definition television broadcasts are not yet widely practiced, apparatus and methods for displaying the NTSC broadcast have been developed. Further, a video signal of the video cassette recorder, having a size of a visual system transmission algorithm (VISTA) on a television receiver with a 16-to-9 aspect ratio, have also been developed. If temporal compression of the video signal is not performed when displaying the NTSC broadcast on the 16-to-9 television receiver, the displayed pictures become spread out in the left and right directions on the screen. Accordingly, to display the NTSC broadcast with a 4-to-3 aspect ratio on the television receiver with a 16-to-9 aspect ratio, the NTSC broadcast signal should be temporally compressed, so that a user can watch the normal video pictures. However, since the temporally compressed video signal is short along the horizontal direction, the left or right side of the screen remains blank.

Also, in existing television receivers capable of displaying still pictures, when a still picture function is performed, an entire moving picture stops being displayed on the screen.

SUMMARY OF THE INVENTION

Therefore, to solve the above problems, it is an object of the present invention to provide a POP control method and apparatus in which a plurality of still pictures are displayed on the left or the right blank portion of a display screen when an NTSC broadcast is displayed on a 16-to-9 screen after temporally compressing the NTSC broadcast. One of the plurality of the still pictures is selected and displayed on a main picture screen.

To accomplish the above objectives, a picture-out-picture control apparatus is provided for converting a video signal, having a first aspect ratio, into a signal adapted for a television receiver, having a second aspect ratio that is wider than the first aspect ratio. The picture-out-picture control apparatus comprises a main picture processor for forming the video signal of the first aspect ratio into a main screen of the television receiver. A picture-out-picture processor forms the video signal of the first aspect ratio into at least one picture-out-picture screen of the television receiver. A multiplexed picture formation portion multiplexes the video signals for the main and picture-out-picture screens into a signal appropriate for the television receiver having the second aspect ratio. A control signal generator controls the picture-out-picture processor and the multiplexed picture formation portion.

Also, a picture-out-picture control method is provided for converting a video signal, having a first aspect ratio, into a signal adapted for a television receiver, having a second aspect ratio that is wider than the first aspect ratio. The picture-out-picture control method comprises the steps of, dividing a screen of the television receiver into a main picture region and a plurality of picture-out-picture regions, and receiving the video signal of the first aspect ratio and forming a main picture to be displayed on the main picture region of the screen. The control method receives the video signal of the first aspect ratio and forms a plurality of picture-out-pictures to be displayed on the plurality of the picture-out-picture regions of the screen; and finally controls the main picture and plurality of the picture-out-pictures to be respectively displayed on the main picture region and the plurality of the picture-out-picture regions of the screen.

DETAILED DESCRIPTION OF THE PREFERRED EMBODIMENT

Figure 1:
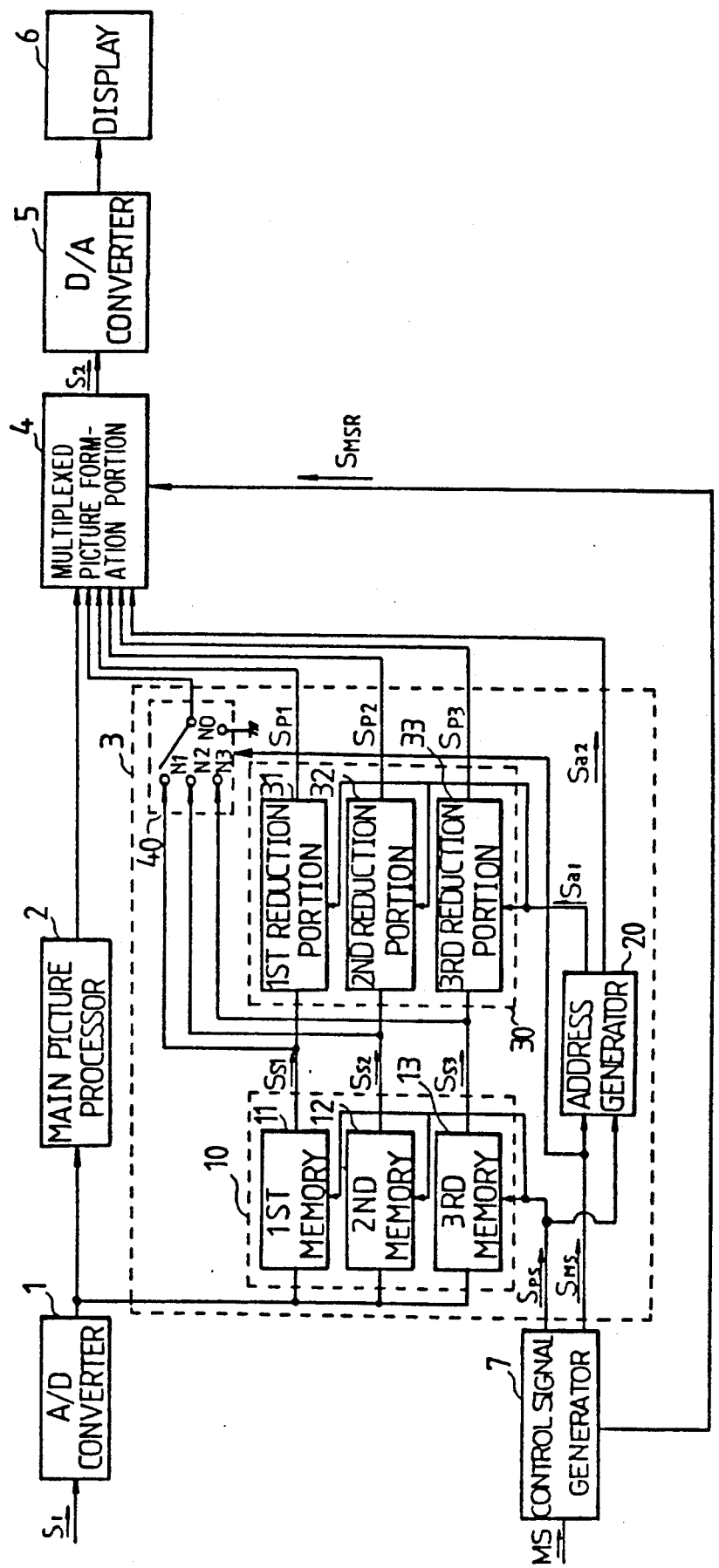
FIG. 1 is a block diagram of a picture-out-picture control apparatus according to the present invention.

A preferred embodiment of the present invention will be described below in more detail with reference to the accompanying drawings. FIG. 1 shows a block diagram of a POP control apparatus of one embodiment of the present invention. The present invention comprises an analog to digital converter (A/D converter) 1, a main picture processor 2, a POP processor 3, a multiplexed picture formation portion 4, a digital to analog converter (D/A converter) 5, a 16-to-9 display and a control signal generator 7. The A/D converter 1 receives an NTSC broadcast video signal and converts the received signal into a digital signal. The main picture processor 2 receives the digitized video signal supplied from the A/D converter 1 and temporally compresses the received signal, thereby converting the signal into a main picture signal for a main picture region on the screen.

The POP processor 3 comprises a still picture storage portion 10, an address generator 20, a POP reduction processor 30 and a switching device 40. The POP processor 3 receives the video signal from the A/D converter 1 and produces video signals for POP regions on the screen. In more detail, the still picture storage portion 10 of the POP processor 3 comprises three memory units 11, 12 and 13 which receive the A/D converted video signals, respectively. The still picture storage portion 10 receives a first selection signal $S_{PS}$ from the control signal generator 7 to select three still pictures from a plurality of main pictures which can be displayed on the main picture region of the screen. Accordingly, the still picture storage portion 10 outputs three selected still pictures $S_{S1}$, $S_{S2}$ and $S_{S3}$ stored in the three memory units 11, 12 and 13, respectively, based on the selection signal $S_{PS}$.

The address generator 20 receives the first selection signal $S_{PS}$ from the control signal generator 7 and generates a first address signal $S_{a1}$ for reducing the three still pictures $S_{S1}$, $S_{S2}$ and $S_{S3}$ to form the POP regions on the screen. The address generator 20 also receives a second selection signal $S_{MS}$ from the control signal generator 7 for selecting one still picture to be displayed on the main picture region of the screen. This selected still picture is one of the three still pictures selected according to the first selection signal $S_{PS}$. The address generator 20 generates a second address signal $S_{a2}$ to multiplex the output video signal of the main picture processor 2 with the output video signals $S_{P1}$, $S_{P2}$ and $S_{P3}$ of the POP processor 3 in the multiplexed picture formation portion 4.

The POP reduction processor 30 comprises three reduction portions 31, 32 and 33 connected to the three memory units 11, 12 and 13 of the still picture processor 10, respectively. The three reduction portions 31, 32 and 33 receive the first address signal $S_{a1}$ generated in the address generator 20 and reduce the still pictures supplied from the memory units, in order to supply reduced still pictures to the multiplexed picture formation portion 4. The switching device 40 selects one still picture among the three still pictures $S_{S1}$, $S_{S2}$ and $S_{S3}$ received from the three memory units 11, 12 and 13 according to the second selection signal $S_{MS}$ of the control signal generator 7 and supplies the selected still picture signal to the multiplexed picture formation portion 4.

The multiplexed picture formation portion 4 is connected to the main picture processor 2, switching device 40 and POP reduction processor 30. The multiplexed picture formation portion 4 receives the second address signal $S_{a2}$ from the address generator 20 and the third selection signal $S_{MSR}$ from the control signal generator 7. Thus, the multiplexed picture formation portion 4 is able to display the still pictures on the screen in the previously blank portions of the screen at the periphery of the temporally-compressed NTSC video signal that is supplied from the main picture processor 2. Alternatively, the multiplexed picture formation portion displays one still picture selected among the POP still pictures on the main picture region of the screen.

Figure 2A:
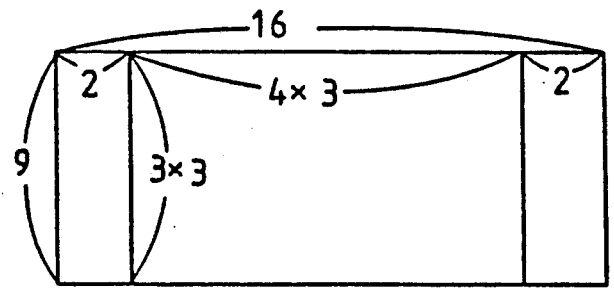
FIGS. 2A through 2D are front views of wide screen formats when the picture-out-picture control apparatus according to the present invention is adapted.
Figure 2B:
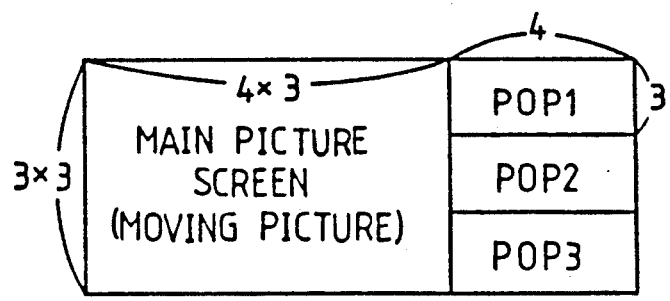
Figure 2C:
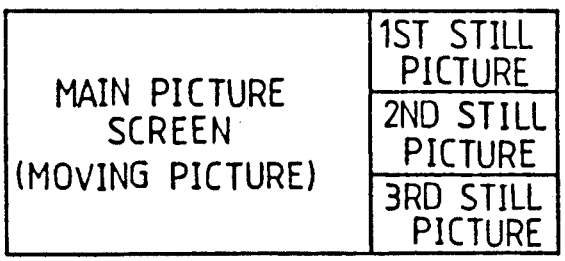
Figure 2D:
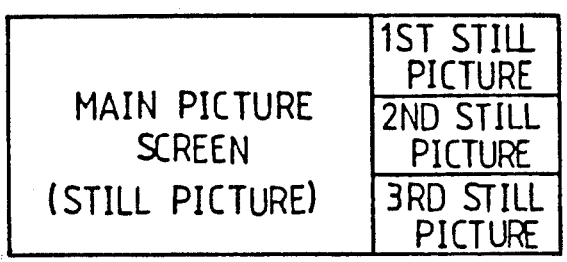

FIGS. 2A to 2D are front views of the wide screen formats according to the present invention. FIG. 2A is a front view showing one way to compress temporally the NTSC picture and display the temporally-compressed signal on a wide screen having a 16-to-9 aspect ratio. FIG. 2B is a front view showing one way to use the peripheral portions of the NTSC main picture region having a 4-to-3 aspect ratio in the POP still picture regions. FIG. 2C is a front view of the three POP still picture regions located on the periphery of the NTSC main picture region having the 4-to-3 aspect ratio. FIG. 2D is a front view showing one way of selecting, enlarging and displaying one of the POP still pictures on the main picture region of the screen. The still picture display apparatus uses a POP processor 3 as shown in FIG. 1 and achieves the displays shown in FIGS. 2C and 2D by applying the POP screen arrangement shown in FIG. 2B along the left and right blank portions of a screen having the wider aspect ratio. This arrangement is achieved when the NTSC video pictures are displayed on the screen as shown in FIG. 2A.

Table 1 presents possible operations of the POP control apparatus of the preferred embodiment according to the present invention. The Table illustrates operations wherein the first selection signal $S_{PS}$ is a still picture selection control signal for the POP screen and a second selection signal $S_{MS}$ is a still picture selection control signal for the main picture screen of the control signal generation portion 7.

TABLE 1

| Cases | Operations |
|---|---|
| A | Main pictures are temporally compressed and displayed. |
| B | Display Main picture (moving picture) & POP picture (1st still picture) |
| C | Display Main picture (moving picture) & POP picture (1st & 2nd still pictures) |
| D | Display Main picture (moving picture) & POP picture (1st, 2nd & 3rd still pictures) |
| E | Display Main picture (1st still picture) & POP picture (1st, 2nd & 3rd still pictures) |
| F | Display Main picture (2nd still picture) & POP picture (1st, 2nd & 3rd still pictures) |
| G | Display Main picture (3rd still picture) & POP picture (1st, 2nd & 3rd still pictures) |

Next, the operations for the present embodiment are represented in Table 2 for the four possible binary states of the first selection signal $S_{PS}$ from the control signal generator 7.

TABLE 2

| $S_{ps}$ | Operations | Cases |
|---|---|---|
| 00 | Option OFF | A |
| 01 | 1st Still picture | B |
| 10 | 2nd Still picture | C |
| 11 | 3rd Still picture | D |

The operations for the present embodiment are represented in Table 3 for the various binary states of the second selection signal Sms from the control signal generator 7.

TABLE 3

| $S_{ms}$ | Operations | Cases |
|---|---|---|
| 000 | Options OFF | A |
| 100 | Option address designation by signal $S_{ps}$ | B, C, D |
| 101 | Change first still picture into a main picture | E |
| 110 | Change second still picture into a main picture | F |
| 111 | Change third still picture into a main picture | G |

Referring to Tables 1, 2 and 3, operation of the present POP control apparatus will be described hereafter in connection with the states of the first selection signal $S_{PS}$ and the second selection signal $S_{MS}$ from the control signal generation portion 7.

When the POP control apparatus operates as in case "A" of Tables 1, 2 and 3, the A/D converter 1, which receives a NTSC input video signal S1, converts an analog video signal into a digital signal. The digital signal is supplied to the main picture processor 2 and the still picture storage portion 10 in the POP processor 3. At this time, the first selection signal $S_{PS}$ from the control signal generator 7 is in a simple mode state which does not use the POP screen.

That is, since the selection mode is in an "OFF" state, the selection signal $S_{PS}$ is in a binary logic state of "00". Therefore, the memory devices 11, 12 and 13 in the still picture storage portion 10 do not store the supplied video signal. Also, the second selection signal $S_{MS}$ from the control signal generator 7 is in a binary logic state of "000," and thus the POP processor 3 also does not operate. Thus, the main picture processor 2 which receives the NTSC video signal from the A/D converter 1 temporally compresses the video signal to transmit the temporally compressed video signal to the multiplexed picture formation portion 4. Here, since the multiplexed picture formation portion 4 does not receive any signal from the POP processor 3, it generates picture data for a screen as shown in FIG. 2A. Accordingly, the picture is prevented from being displayed in a spread out manner along left and right directions across the screen.

When the POP control apparatus operates as in case "B" of the Tables 1, 2 and 3, the binary logic H state of the first selection signal $S_{PS}$ from the control signal generator 7 is "01". Thus, the digitized video signal supplied to the still picture storage portion 10 is stored in the first memory unit 11. Then, an output signal $S_{S1}$ of the first memory unit 11 is supplied to a first reduction portion 31 in the POP reduction processor 30, thereby reducing a ratio of the picture to an area one-ninth of the original screen size. Also, the output signal $S_{S1}$ of the first memory unit 11 is supplied to a contact N1 of the switching device 40. In case "B", the second selection signal $S_{MS}$ is in a binary logic state of "100" and thus the switching blade of the switching device 40 is moved to contact the ground N. Address generator 20, which receives the first selection signal $S_{PS}$ and the second selection signal $S_{MS}$, outputs an address signal $S_{a1}$ which designates an address of the still picture region in the POP screen. Also, the address signal $S_{a1}$ activates the first reduction portion 30.

The address generator 20 also supplies an address signal $S_{a2}$ to the multiplexed picture formation portion 4 to receive the main picture. The still picture, which is stored in the first memory unit 11 within the still picture storage portion 10, is multiplexed and displayed with the received main picture. Here, memory units 11, 12 and 13 in the still picture storage portion 10 operate only when particular and respective signals are applied thereto. If a particular drive signal is applied, the data stored in corresponding memory device is deleted and new data is stored therein. Therefore, the first memory unit 11 stores new data only when the state of signal $S_{PS}$ is a binary logic value of "01".

When the POP control apparatus operates as in case "C" of the Tables 1, 2 and 3, the binary logic state of the first selection signal $S_{PS}$ of the control signal generator 7 is "10". Thus, the second memory unit 12 stores the digitized video signal supplied thereto. Then, an output signal $S_{S2}$ of the second memory unit 12 is supplied to a second reduction portion 32 in the POP reduction processor 30, thereby reducing a ratio of the picture to one-ninth of the original screen. Also, the output signal $S_{S2}$ of the second memory unit 12 is supplied to a contact N2 of the switching device 40. The second selection signal $S_{MS}$ is in a binary logic state of "100", and thus the switching blade of the switching device 40 contacts the ground N. The address generator 20 which receives the first selection signal $S_{PS}$ and the second selection signal $S_{MS}$ outputs an address signal $S_{a1}$ for designating an address of the still picture region in the POP screen and for designating an address of the second reduction portion 32 in the POP processor 30.

The address generator 20 also supplies a signal $S_{a2}$ to the multiplexed picture formation portion 4, in order to receive the main picture. Thus, the still pictures stored in the first memory unit 11 and the second memory unit 12 within the still picture storage portion 10 are multiplexed and displayed with the received main picture. Here, once the picture reduction portions 31, 32 and 33 in the POP processor 30 are assigned with the address regions, they maintain the same addresses as long as the same data inputs are maintained. Accordingly, the multiplexed picture formation portion 4 multiplexed the input data supplied from the first and second reduction portions 31 and 32 and are displayed together with the main picture.

When the POP control apparatus operates as in case "D" of the Tables 1, 2 and 3, the binary logic state of the first selection signal $S_{PS}$ is "11" and that of second selection signal $S_{MS}$ is "100". Thus, the third memory unit 13 and the third reduction portion 33 are additionally driven and the above operations are repeated. According to the above operations, the still pictures are selected from the main picture and displayed on the POP screen. Then, among the still pictures, a desired still picture can be displayed on the main picture screen.

Cases E, F and G have no relation to the first selection signal $S_{PS}$, but relate only to the second selection signal $S_{MS}$. In other words, when the POP control apparatus operates as in case 37 D", the binary logic state of second selection signal $S_{MS}$ is "101". Therefore, the switching blade in the switching device 40 is connected to the contact N1 where the output signal $S_{S1}$ of the first memory unit 11 is applied. In this case, the multiplexed picture formation portion 4 multiplexes the pictures, so that the data signal $S_{S1}$, for which the picture ratio is not reduced, can be displayed on the main picture screen with priority over the data supplied from the main picture processor 2. Simultaneously, the reduced picture signals $S_{P1}$, $S_{P2}$ and $S_{P3}$ output from the first, second, and third reduction portions 31, 32 and 33, respectively, are displayed on the POP screens.

In cases "F" and "G", control of the switching device 40 is varied according to the state of the second selection signal $S_{MS}$. THUS, the signal displayed on the main picture screen is varied and the operation is the same as described above. To change the main picture screen from a still picture to a moving picture, the third selection signal $S_{MSR}$ of the control signal generator 7 should be turned ON. In this manner, the still picture, which is multiplexed to be displayed on the main picture screen, disappears and instead data supplied from the main picture processor 2 is replaced as the data of the main picture screen.

As described above, the present invention is directed to three POP screens as shown in FIGS. 2B, 2C and 2D for the NTSC broadcast. However, as shown in FIG. 2A, a person skilled in the art would realize that a total of twelve. POP screens with six left and six right POP screens can be included. Also, the POP screens according to the present invention can be applied in broadcast systems other than the NTSC broadcast as described above.

As described above, the still picture screen control apparatus using the picture-out-picture technology is provided, thereby solving the existing problems which occur when the NTSC broadcast is displayed on the television receiver having the 16-to-9 aspect ratio. At the same time, the POP screens facilitate search or comparison of important pictures while watching the TV.

What is claimed is:

1. A picture-out-picture control apparatus for converting a first video signal, having a first aspect ratio, into a second video signal adapted for a television receiver having a second aspect ratio which is wider than the first aspect ratio, said picture-out-picture control apparatus comprising:

a main picture processor for converting the first video signal, having the first aspect ratio, into a video signal for a main screen of said television receiver;

a picture-out-picture processor for converting the first video signal, having the first aspect ratio, into a video signal for at least one picture-out-picture screen of said television receiver;

a multiplexed picture formation portion for multiplexing the video signals for said main and picture-out-picture screens and forming said second video signal having the second aspect ratio; and a control signal generator for controlling said picture-out-picture processor and said multiplexed picture formation portion.

2. The picture-out-picture control apparatus according to claim 1, wherein said main picture processor temporally compresses the video signal, having the first aspect ratio, in order to display a compressed video signal on the main picture screen of said television receiver.

3. The picture-out-picture control apparatus according to claim 1, wherein the first video signal, having the first aspect ratio, is a digital video signal.

4. The picture-out-picture control apparatus according to claim 2, wherein the first video signal, having the first aspect ratio, is a digital video signal.

5. The picture-out-picture control apparatus according to claim 1, further comprising an analog to digital converter for converting the first video signal having the first aspect ratio into a digital video signal.

6. The picture-out-picture control apparatus according to claim 2, further comprising an analog to digital converter for converting the first video signal having the first aspect ratio into a digital video signal.

7. The picture-out-picture control apparatus according to claim 3, wherein said picture-out-picture processor comprises:

a still picture storage portion for storing a still picture of the digital video signal, having the first aspect ratio, according to a first signal from said control signal generator;

a picture-out-picture reduction processor for reducing an output signal of said still picture storage portion into said second video signal having the second aspect ratio;

a switching device for selectively supplying video signals from said still picture storage portion to said multiplexed picture formation portion according to a second signal of said control signal generator in order to be displayed on the main picture screen of said television receiver; and an address generator for receiving said first and second signals of said control signal generator, supplying an address signal for assigning a region of the picture-out-picture screen of said television receiver to said picture-out-picture reduction processor and supplying a control signal to said multiplexed picture formation portion in order to multiplex the main picture screen and the picture-out-picture screens.

8. The picture-out-picture control apparatus according to claim 4, wherein said picture-out-picture processor comprises:

a still picture storage portion for storing a still picture of the digital video signal, having the first aspect ratio, according to a first signal from said control signal generator;

a picture-out-picture reduction processor for reducing an output signal of said still picture storage portion into said second video signal having the second aspect ratio;

a switching device for selectively supplying video signals from said still picture storage portion to said multiplexed picture formation portion according to a second signal of said control signal generator in order to be displayed on the main picture screen of said television receiver; and an address generator for receiving said first and second signals of said control signal generator, supplying an address signal for assigning a region of the picture-out-picture screen of said television receiver to said picture-out-picture reduction processor and supplying a control signal to said multiplexed picture formation portion in order to multiplex the main picture screen and the picture-out-picture screens.

9. The picture-out-picture control apparatus according to claim 5, wherein said picture-out-picture processor comprises:

a still picture storage portion for storing a still picture of the digitized video signal supplied from said analog to digital converter according to a first signal of said control signal generator;

a picture-out-picture reduction processor for reducing an output signal of said still picture storage portion into said second video signal having the second aspect ratio;

a switching device for selectively supplying video signals from said still picture storage portion to said multiplexed picture formation portion according to a second signal of said control signal generator in order to be displayed on the main picture screen of said television receiver; and an address generator for receiving said first and second signals of said control signal generator, supplying an address signal for assigning a region of the picture-out-picture screen of said television receiver to said picture-out-picture reduction processor and supplying a control signal to said multiplexed picture formation portion in order to multiplex the main picture screen and the picture-out-picture screens.

10. The picture-out-picture control apparatus according to claim 6, wherein said picture-out-picture processor comprises:

a still picture storage portion for storing a still picture of the digitized video signal supplied from said analog to digital converter according to a first signal of said control signal generator;

a picture-out-picture reduction processor for reducing an output signal of said still picture storage portion into said second video signal having the second aspect ratio;

a switching device for selectively supplying video signals from said still picture storage portion to said multiplexed picture formation portion according to a second signal of said control signal generator in order to be displayed on the main picture screen of said television receiver; and an address generator for receiving said first and second signals of said control signal generator, supplying an address signal for assigning a region of the picture-out-picture screen of said television receiver to said picture-out-picture reduction processor and supplying a control signal to said multiplexed picture formation portion in order to multiplex the main picture screen and the picture-out-picture screens.

11. A picture-out-picture control method for converting a first video signal, having a first aspect ratio, into a second video signal adapted for a television receiver having a second aspect ratio that is wider than the first aspect ratio, the picture-out-picture control method comprising the steps of:

dividing an original screen of said television receiver into a main picture region and a plurality of picture-out-picture regions;

receiving the first video signal, having the first aspect ratio, and converting a received video signal into a main video signal to be displayed on said main picture region of said original screen;

receiving the video signal having the first aspect ratio and converting the received video signal into a plurality of picture-out-picture video signals to be displayed on said plurality of the picture-out-picture regions of said original; and controlling the main video signal and the plurality of the picture-out-picture video signals to be respectively displayed on said main picture region and said plurality of the picture-out-picture regions of said original screen.

12. The picture-out-picture control method according to claim 11, further comprising the step of converting the first video signal having the first aspect ratio into a digital video signal.

13. The picture-out-picture control method according to claim 11, wherein one still picture of said plurality of picture-out-picture video signals is displayed on said main picture screen.

14. The picture-out-picture control method according to claim 11, wherein, when control signals for said plurality of picture-out-picture video signals does not exist in said controlling step, pictures are displayed with an extension in only a horizontal direction without temporal compression of the video signal on said main picture screen.

15. The picture-out-picture control method according to claim 11, wherein the first video signal having the first aspect ratio is temporally compressed to be displayed on said main picture screen.

* * * * *